United States Patent [19]

Robinson

[11] 4,341,443

[45] Jul. 27, 1982

[54] LIGHT REFLECTIVE SAFETY DEVICE

[75] Inventor: Jerrold Robinson, Scarsdale, N.Y.

[73] Assignee: The Dimension Weld International Corp., Stamford, Conn.

[21] Appl. No.: 806,278

[22] Filed: Jun. 13, 1977

[51] Int. Cl.³ .................................................. G02B 5/12

[52] U.S. Cl. ........................................ 350/98; 350/103

[58] Field of Search .................... 350/288, 97, 102, 98, 350/96 B, 161, 295, 103-108; D10/114, 115

[56] References Cited

U.S. PATENT DOCUMENTS

| | | | |
|---|---|---|---|
| 2,287,865 | 6/1942 | Carleton | 350/98 |
| 2,807,984 | 10/1957 | Bailey | 350/98 |
| 3,038,381 | 6/1962 | Jones | 350/98 |
| 3,276,416 | 10/1966 | Dirks et al. | 350/98 |
| 3,684,348 | 8/1972 | Rowland | 350/103 |
| 3,871,336 | 3/1975 | Bergman | 350/98 |
| 3,994,560 | 11/1976 | Rice | 350/99 |

FOREIGN PATENT DOCUMENTS

| | | | |
|---|---|---|---|
| 1315329 | 12/1962 | France | 350/98 |

*Primary Examiner*—R. A. Rosenberger
*Attorney, Agent, or Firm*—Michael J. Striker

[57] ABSTRACT

A light-reflective safety device for children walking on dark roads has a tag composed of an opaque layer of plastic foam sandwiched between a colored translucent layer of vinyl and a clear transparent layer of vinyl. The layers are heat-bonded to one another in a zone extending along the tag periphery and in zones inwardly of the tag periphery. In these zones the foam has melted and the color of the one layer is visible through the clear layer. Within each zone a convex area is formed from which impinging light is reflected and scattered. A hanger serves to secure the tag to the child.

6 Claims, 2 Drawing Figures

LIGHT REFLECTIVE SAFETY DEVICE

BACKGROUND OF THE INVENTION

This invention relates to a light-reflective safety device.

The invention is especially, although not exclusively, useful as a light-reflective safety device for children who walk, bicycle or otherwise move on dark streets or roads where there is a danger that the child might not be seen by a motorist in time to avoid an accident.

Such accidents are, unfortunately, all too common, especially in rural and suburban areas where roads are lighted inadequately or not at all. Children walking to school or to a bus pick-up point on dark winter mornings, or walking, bicycling or other wise moving on such roads in the evening, are always in danger of being injured by motorists who see the child too late to take evasive action or to safely brake their vehicle.

In a number of countries it is now law or, as is the case in Sweden, it is strongly suggested by the authorities, that pedestrains or after-dark cyclists of all ages wear a reflctor of some type. In Sweden, for example, the number of accidents of the kind mentioned above has been decreased drastically by this measure. A need for a simple, inexpensive and light-weight reflective device also exists in the United States where darkness-related accidents have recently claimed as many as 10,000 lives per year.

SUMMARY OF THE INVENTION

It is an object of the present invention to provide a light-reflective safety device which alerts motorists to the presence of a person on a dark roadway.

Another object of the invention is to provide such a safety device which is particularly appealing to children.

An additional object is to object a safety device of the character in question, which can be manufactured simply and inexpensively and can, accordingly, be sold at low cost so as to find wide distribution.

In keeping with these objects, and with others which will become apparent hereafter, one feature of the invention resides in a light-reflective safety-device, particularly for use by children on dark roads. Briefly stated, the device may comprise a tag composed of a layer of padding material sandwiched between two layers of at least translucent synthetic plastic sheet material, the layers being heat-bonded to one another in a zone extending at least along the circumference of the tag and together having a three-dimensional shape, and means for attaching the tag to a user.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Figure 1:
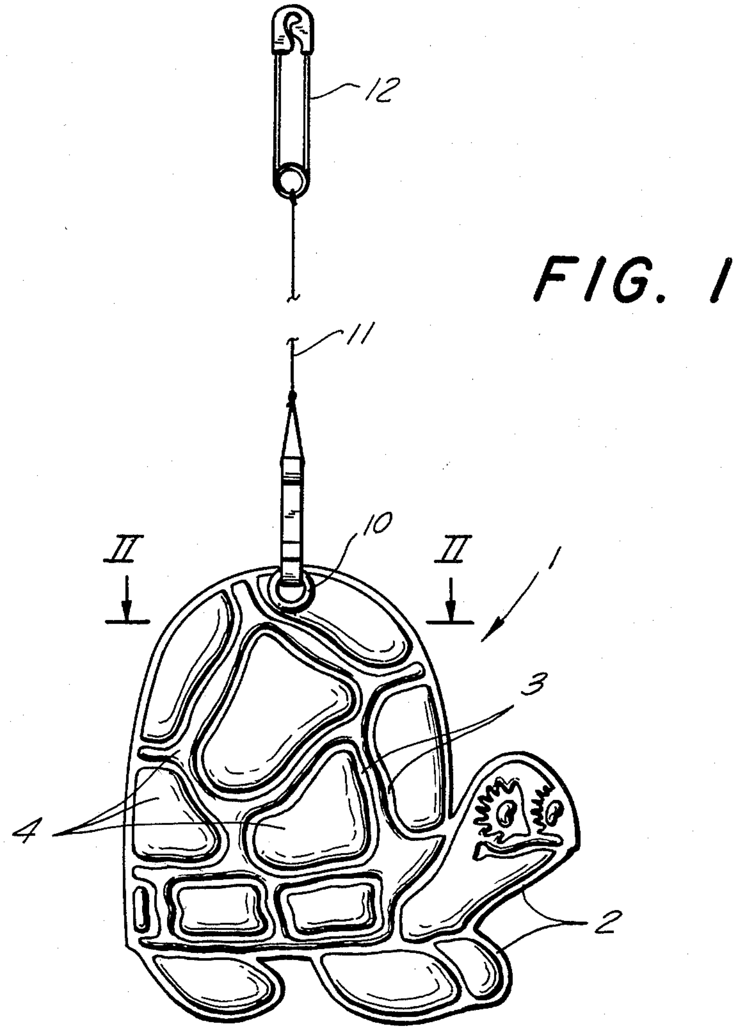
FIG. 1 is a plan view of a device according to the invention.
Figure 2:
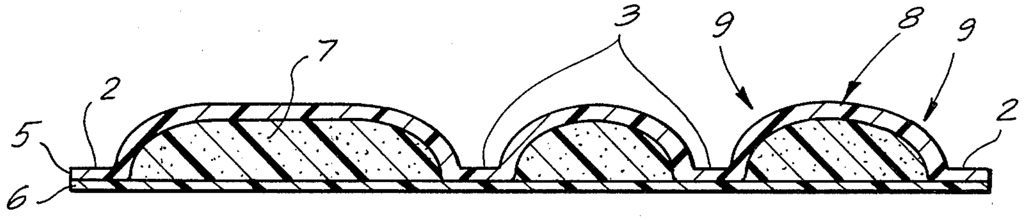
FIG. 2 is a section on line II—II of FIG. 1.

DESCRIPTION OF A PREFERRED EMBODIMENT an exemplary embodiment of the invention is shown in FIGS. 1 and 2 of the drawing. The illustrated device has a tag 1 which is here shown in form of a turtle, but can of course have any desired shape or configuration whatsoever.

The tag 1 is composed of an opaque layer 7 of (preferably white) synthetic plastic foam material of the open-cell or the closed-cell type. This layer 7 is sandwiched between two outer layers 5 and 6 of synthetic plastic sheet material, e.g., polyvinylchloride, polyethylene, or the like. Layer 5 is preferably clear (i.e., colorless) and transparent whereas layer 6 is colored and either transparent or at least translucent.

The layers 5, 6 and 7 are heat-bonded to one another in a zone 2 which extends along the periphery of the tag 1. They are preferably heat-bonded to one another in additional zones 3 within the space surrounded by the zone 2. The heat-bonding is effected by radio-frequency (RF) welding, a technique which is fully known per se in the art and requires no discussion. The sandwich composed of layers 5, 6 and 7 is placed into a support and a die having the shape desired for the tag is pressed against the sandwich and support. The die has lands or pressure faces corresponding to the zones 2, 3. Outwardly surrounding the land corresponding to the zone 2 it also has a "cutting edge" which severs the layers 5, 6, 7 from the surrounding material so that the finished tag can be lifted away from the remaining scrap material. At the same time as the die is pressed against the sandwich, radio-frequency is applied to it so that the sandwich is heated in the zones 2, 3.

The heat and pressure cause the foam of layer 7 to collapse in the zones 2, 3 and to aid in bonding the layers 5, 6 together in these zones. Due to the collapse of the foam of layer 7 the color of the layer 6 becomes visible through layer 5 in the zones 2, 3. Thus, if e.g., the layer 6 is red and the layer 7 is white, the zones 2, 3 will appear red and surround the white areas 4 in which the foam layer 7 is visible through the layer 5.

The areas 4 are convex, i.e., their flanks 9 rise up gradually from the surrounding zones 2 or 3 (FIG. 2). Thus, light from a vehicle approaching a person equipped with the device, e.g. a walking child, will be reflected and scattered from these areas 4, warning the driver of the vehicle that there is an obstruction on the road ahead of him.

The tag 1 is provided with means to secure it to a user. As illustrated, this may be in terms of a hole 10 through which a thread 11 (e.g., an elastic thread) is drawn. A safety pin 12 or other means may be provided to secure the thread 11 to a garment of a user, of course, the tag 1 could be pinned directly to a garment, but when it "dangles" from the thread 11 the tag 1 tends to move about with the movements of the user and the areas 4 (and their flanks 9) are thus even more effective in "catching" light and reflecting and scattering it. The tag need not be secured to a garment; it could be secured directly to the user (e.g., thread 11 could be looped about a wrist of the child) or it could be secured to a possession of a user (e.g., to the rear and/or the handle bars of a bicycle).

The exposed surfaces of layers 5 and 6 are preferably very smooth and "shiny" to enhance the light-reflection ability of the tag. Layer 7 need not be white, although this color—especially in combination with the shiny layer 5—produces a highly reflective "shimmering" effect. Layer 7 could also be of fibrous sliver (e.g., Dynel-TM) instead of foam. Both of the layers 5, 6 could be clear and transparent, or both could be colored and transparent and/or translucent.

A particularly effective material for the layers 5 and 6 is an embossed retro-reflective vinyl which is the subject of U.S. Pat. Nos. 3,684,346 and 3,684,348. Such material is commercially available under the tradename "Reflexite" in sheet form, having one of its sides embossed with prism-shaped configurations (about 44,000 per square inch). This material is very highly retroreflective in that it returns incident light at the angle of incidence. When it is used as the layers 5 and 6, with the embossed sides of both layers facing the foam layer 7, it provides excellent reflectivity. However, this reflectivity is increased still further by an astonishing amount, due to the curvature of the areas 4 and their flanks 9. The reason for this is that this curvature places surface areas of the layers 5 and 6 into retro-reflective position which were previously not in such a position. In other words: while light which impinges the surface in non-perpendicular direction will not be retro-reflected, such reflectivity is now obtained due to the fact that portions of the areas 4 and flanks 9 are (because of their curvature) so inclined to the incident light (from whichever direction it may come) that a large portion of the light will always be retroreflected and warn the vehicle operator.

The layers 5, 6 need not, incidentally, be the outer layers. They could, instead, each be covered by a transparent, smooth outer vinyl layer. However, this would actually only increase manufacturing costs without thereby increasing reflectivity. The foam layer 7 could be replaced (or supplemented) by a layer (one on each side of the foam layer, if desired) of metallized vinyl or metallized Mylar (TM), either in one piece or in form of vinly or Mylar particles. Crystals or small glass beads could also be used if desired.

Naturally, while the invention is of particular advantage for use by children, it is not so limited and is applicable whenever a superior reflecting device is required.

While the invention has been illustrated and described as embodied in a hang-tag, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A light-reflective safety-device, particularly for use by children on dark roads, comprising a tag composed of a layer of padding material sandwiched between two layers of at least translucent synthetic plastic sheet material, said layers being heat-bonded to one another in a first zone extending along the circumference of the tag and in additional zones inwardly of said first zone so as to delineate a plurality of raised padded areas on said tag, said areas being convexly curved and each being circumferentially flanked by continuous planar surface portions which are inclined to the general plane of the tag so that light impinging on said convex areas is scattered and reflected; and means for attaching said tag to a user.

2. A device as defined in claim 1, wherein said layer of padding material is opaque and one of said sheet-material layers is clear and transparent.

3. A device as defined in claim 2, wherein the other of said sheet-material layers is colored and said padding-material layer is of synthetic plastic foam which is melted in said zone so that the color of said other sheet-material layer is visible in said zone through said one sheet-material layer.

4. A device as defined in claim 3, wherein the color of said other sheet-material layer is visible in all of.

5. A device as defined in claim 1, wherein said layers of sheet material each have a surface facing inwardly towards said layer of padding material and provided with a multiplicity of light-reflecting embossments.

6. A device as defined in claim 1, wherein said layers of sheet material each have retroreflecting means on at least one of their respective major surfaces.

* * * * *